United States Patent
Hosokawa et al.

(10) Patent No.: US 8,462,894 B2
(45) Date of Patent: Jun. 11, 2013

(54) RECEIVER CIRCUIT AND RECEIVER APPARATUS INCLUDING THE SAME

(75) Inventors: Yoshifumi Hosokawa, Osaka (JP); George Hayashi, Osaka (JP); Ippei Kanno, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/274,027

(22) Filed: Oct. 14, 2011

(65) Prior Publication Data

US 2012/0033766 A1    Feb. 9, 2012

Related U.S. Application Data

(63) Continuation of application No. PCT/JP2011/000205, filed on Jan. 17, 2011.

(30) Foreign Application Priority Data

Jul. 28, 2010 (JP) .................................. 2010-169367

(51) Int. Cl.
 *H04L 27/06* (2006.01)
(52) U.S. Cl.
 USPC ........... 375/340; 275/344; 275/349; 275/345; 275/350; 329/306; 329/345; 329/346; 329/353; 329/358; 455/226.1; 455/226.2; 455/226.3; 455/315
(58) Field of Classification Search
 USPC .......... 375/340, 344, 349, 345, 350; 329/306, 329/345, 346, 353, 358; 455/226.1, 226.2, 455/226.3, 315
 See application file for complete search history.

(56) References Cited

U.S. PATENT DOCUMENTS

| | | | |
|---|---|---|---|
| 5,732,342 A | 3/1998 | Roth et al. | |
| 5,930,696 A | 7/1999 | Tzuang et al. | |
| 5,940,143 A | 8/1999 | Igarashi et al. | |
| 6,107,878 A | 8/2000 | Black | |
| 6,134,430 A | 10/2000 | Younis et al. | |
| 6,498,929 B1 * | 12/2002 | Tsurumi et al. | ............... 455/296 |
| 7,317,493 B1 | 1/2008 | Hutchinson et al. | |
| 7,430,404 B2 | 9/2008 | Oiwa | |
| 7,599,674 B2 | 10/2009 | Layne | |
| 2002/0131533 A1 | 9/2002 | Koizumi | |

(Continued)

FOREIGN PATENT DOCUMENTS

| | | |
|---|---|---|
| JP | 2002-280852 | 9/2002 |
| JP | 2004-506344 | 2/2004 |

(Continued)

OTHER PUBLICATIONS

International Search Report issued in International Patent Application No. PCT/JP2011/000205, filed on Jan. 17, 2011.

*Primary Examiner* — Daniel Washburn
*Assistant Examiner* — Rahel Guarino
(74) *Attorney, Agent, or Firm* — McDermott Will & Emery LLP

(57) ABSTRACT

In a receiver circuit, an analog signal processor frequency-converts an input high frequency signal into a baseband signal, and performs low pass filtering at a cutoff frequency below a desired-wave band. An ADC converts an output of the analog signal processor into a digital signal. A digital signal processor compensates an output of the ADC for a signal component in the desired-wave band which has been attenuated by the filtering operation of the analog signal processor.

13 Claims, 10 Drawing Sheets

U.S. PATENT DOCUMENTS

| | | |
|---|---|---|
| 2005/0147192 A1* | 7/2005 | Yamamoto et al. ............ 375/345 |
| 2006/0132346 A1* | 6/2006 | Tryggvason et al. ......... 341/155 |
| 2007/0140381 A1* | 6/2007 | Suemitsu et al. ............. 375/324 |
| 2009/0163163 A1 | 6/2009 | Itoh |
| 2009/0298454 A1 | 12/2009 | Ikeda et al. |

FOREIGN PATENT DOCUMENTS

| | | | |
|---|---|---|---|
| JP | 2004-180156 | | 6/2004 |
| JP | 2005-286529 | | 10/2005 |
| JP | 2006-210979 | * | 8/2006 |
| JP | 2006-229765 | | 8/2006 |
| JP | 2007-174101 | | 7/2007 |
| JP | 2007-281633 | | 10/2007 |
| JP | 2007-318601 | | 12/2007 |
| JP | 2008-005259 | * | 1/2008 |
| JP | 2009-147616 | | 7/2009 |

* cited by examiner

RECEIVER CIRCUIT AND RECEIVER APPARATUS INCLUDING THE SAME

CROSS-REFERENCE TO RELATED APPLICATION

This is a continuation of PCT International Application PCT/JP2011/000205 filed on Jan. 17, 2011, which claims priority to Japanese Patent Application No. 2010-169367 filed on Jul. 28, 2010. The disclosures of these applications including the specifications, the drawings, and the claims are hereby incorporated by reference in its entirety.

BACKGROUND

The present disclosure relates to receiver circuits, and more particularly to receiver circuits which frequency-convert high frequency signals used in mobile phones, broadcasting systems, etc. into baseband signals.

Generally, a high frequency signal input to a receiver circuit is amplified by a low noise amplifier (LNA) first, and then is frequency-converted into a baseband signal by a frequency converter. Then, after the baseband signal is amplified by an automatic gain control (AGC) amplifier, an analog filter performs low-pass filtering for attenuating the interference wave adjacent to the desired-wave band. In some cases, an equalizer is provided in a succeeding stage of the analog filter, and thus compensation is performed for a phase change due to a filtering operation of the analog filter. Some receiver circuits having such a configuration seek to reduce the power consumption by setting a relatively high cutoff frequency to the analog filter and by halting operation of the equalizer if no interference waves are present (see, e.g., Japanese Patent Publication No. 2008-005259).

In order to reduce the power consumption of a receiver circuit, reduction of the operating voltage is effective. However, reducing the operating voltage of a receiver circuit causes the distortion characteristic of each signal processing block, especially of the AGC amplifier which amplifies the baseband signal, to degrade significantly, thereby posing a problem in that the interference wave immunity of the receiver apparatus is reduced. That is, a conventional receiver circuit is not capable of sufficiently reducing a distortion component due to an interference wave only by reducing the operating voltage, and thus has limitations on the interference wave immunity. In addition, reducing the operating voltage of a receiver circuit also poses a problem in that if the reception level of the input desired wave is too high, the signal to noise plus distortion ratio (SNDR) is reduced due to a distortion component caused by the desired wave. This is a serious problem for a receiver circuit of an analog broadcast signal which requires a high SNDR such as an NTSC or PAL signal.

SUMMARY

A receiver circuit according to the present disclosure is advantageous in that even low voltage operation keeps preferred interference wave immunity and a preferred SNDR.

A receiver circuit according to one example includes an analog signal processor configured to frequency-convert an input high frequency signal into a baseband signal, and to perform low pass filtering at a cutoff frequency below a desired-wave band, an analog-to-digital converter (ADC) configured to convert an output of the analog signal processor into a digital signal, and a digital signal processor configured to compensate an output of the ADC for a signal component in the desired-wave band which has been attenuated by the filtering operation of the analog signal processor.

According to this, even if the distortion characteristic of each signal block of the receiver circuit significantly degrades due to low voltage operation, the filtering characteristic of the analog signal processor allows the distortion component to be reduced, and the compensator compensates the signal component of the desired wave, thereby allowing the interference wave immunity and the SNDR of the receiver circuit to be improved.

For example, the analog signal processor includes a first amplifier configured to perform low noise amplification on the high frequency signal, a local oscillator configured to generate a local oscillator signal, a frequency converter configured to frequency-convert an output of the first amplifier using the local oscillator signal, and to perform the low pass filtering on a frequency-converted signal at the cutoff frequency below the desired-wave band, a second amplifier configured to amplify an output of the frequency converter, and an analog filter configured to attenuate a signal component outside of the desired-wave band contained in an output of the second amplifier. The digital signal processor includes a digital filter configured to remove a signal component outside of the desired-wave band contained in the output of the ADC, and a compensator configured to filter an output of the digital filter with an inverse characteristic relative to that of the frequency converter. In addition, filtering characteristics of the frequency converter and of the compensator may be variable, and the receiver circuit may include a control unit configured to control the respective filtering characteristics of the frequency converter and of the compensator depending on a reception level of the high frequency signal.

A gain of at least one of the first or the second amplifier may be variable, and for example, if the reception level of the high frequency signal is low, the control unit increases the variable gain and the cutoff frequency of the frequency converter, and if the reception level of the high frequency signal is high, the control unit decreases the variable gain and the cutoff frequency of the frequency converter. Alternatively, the control unit may detect a presence or absence of a high level of interference wave adjacent to the desired-wave band from a level difference between an input and the output of the digital filter, and if the interference wave is not detected, the control unit may increase the cutoff frequency of the frequency converter, and if the interference wave is detected, the control unit may decrease the cutoff frequency of the frequency converter.

Alternatively, for example, the analog signal processor includes a first amplifier configured to perform low noise amplification on the high frequency signal, a local oscillator configured to generate a local oscillator signal, a frequency converter configured to frequency-convert an output of the first amplifier using the local oscillator signal, a second amplifier configured to amplify an output of the frequency converter, and an analog filter configured to perform the low pass filtering on an output of the second amplifier at the cutoff frequency below the desired-wave band. The digital signal processor includes a digital filter configured to remove a signal component outside of the desired-wave band contained in the output of the ADC, and a compensator configured to filter an output of the digital filter with an inverse characteristic relative to that of the analog filter. In addition, a gain of the second amplifier may be variable, and the receiver circuit may include a control unit configured to control the gain of the second amplifier depending on a reception level of the high frequency signal. The analog signal processor may further include a third amplifier configured to amplify an output of the analog filter with a variable gain, and the control unit may control a gain of the third amplifier depending on the reception level of the high frequency signal.

The receiver circuit may include a demodulator configured to demodulate a signal output from the digital signal processor. For example, the demodulator evaluates signal quality after demodulation, and the control unit adjusts the filtering characteristic of the compensator based on an evaluation result of the demodulator.

DETAILED DESCRIPTION

First Embodiment

Figure 1:
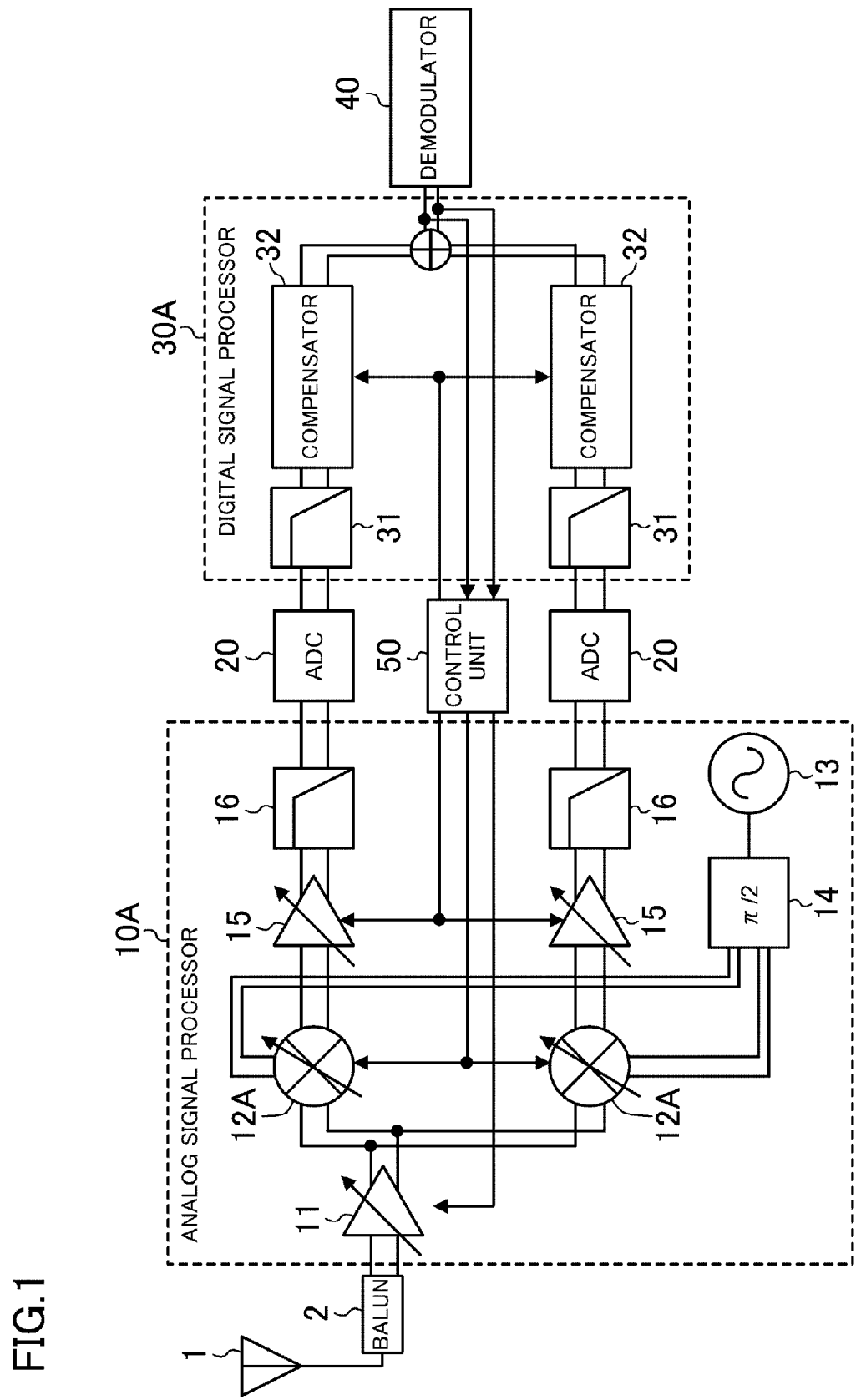
FIG. 1 is a configuration diagram of a receiver circuit according to the first embodiment.

FIG. 1 illustrates a configuration of a receiver circuit according to the first embodiment. A high frequency signal (RF signal) received by an antenna 1 is converted into a differential RF signal, composed of two signals which are 180 degrees out of phase relative to each other, by a balun 2. The RF signal is not limited to a radio signal, but may be a wired signal input through a cable. An analog signal processor 10A performs quadrature conversion on the differential RF signal, thereby generates I and Q baseband signals. More specifically, in the analog signal processor 10A, a low noise amplifier (LNA) 11 performs low noise amplification on the differential RF signal. The gain of the LNA 11 may be either variable or fixed. Frequency converters 12A frequency-convert the output of the LNA 11 respectively using I and Q local oscillator signals. Such local oscillator signals are obtained by applying phase shifts to a local oscillator signal generated by a local oscillator 13 using a 90-degree phase shifter 14 so as to introduce a phase shift of 90 degrees relative to each other. Moreover, the frequency converters 12A perform low pass filtering on the frequency-converted signals.

Figure 2:
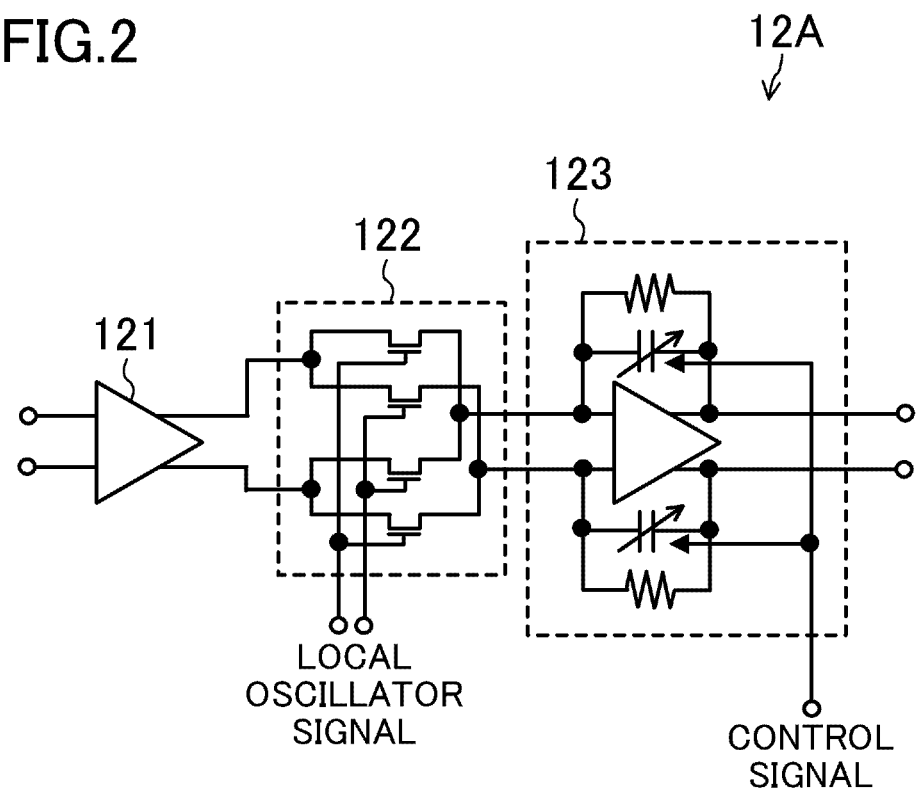
FIG. 2 is a diagram illustrating an example configuration of the frequency converter.

FIG. 2 illustrates an example configuration of the frequency converters 12A. The frequency converters 12A include an amplifier 121 which amplifies the input differential RF signal, a switch unit 122 which frequency-converts the differential output of the amplifier 121 using the local oscillator signals, and an analog filter 123 which performs low pass filtering on the frequency-converted signals at a variable cutoff frequency. The analog filter 123 according to this embodiment utilizes a capacitor bank configuration, in which a control signal controls the capacitance value. However, the resistance value may be variable instead. The filtering characteristic of the analog filter 123 may be a fixed filtering characteristic dependent on the desired-wave band. Furthermore, the analog filter 123 may be a higher-order Butterworth filter, Chebyshev filter, elliptic filter, etc. Note that, in any case, the cutoff frequency of the analog filter 123 is below the desired-wave band, and preferably is about half the desired-wave band.

Returning to FIG. 1, in the analog signal processor 10A, amplifiers 15 amplify the respective outputs of the frequency converters 12A. The amplifiers 15 may be an AGC amplifier. Alternatively, the gain of the amplifiers 15 may be fixed. Analog filters 16 attenuate signal components outside of the desired-wave band contained in the outputs of the amplifiers 15. The analog filters 16 may be a low pass filter (LPF) having a cutoff frequency above the desired-wave band.

ADCs 20 respectively convert the I and Q baseband signals output from the analog signal processor 10A into digital signals. A digital signal processor 30A compensates the digital signals for the signal components in the desired-wave band attenuated by the filtering operation of the analog signal processor 10A. More specifically, in the digital signal processor 30A, digital filters 31 remove the signal components outside of the desired-wave band contained in the input digital signals. Compensators 32 filter the outputs of the digital filters 31 with an inverse characteristic relative to that of the frequency converters 12A. The I and Q baseband signals, which have been converted into digital signals and output from the compensators 32, are combined by a digital operation, and then the result is output from the digital signal processor 30A. There may be provided only one of the digital filters 31 and one of the compensators 32, and the process may be implemented in such a way that the I and Q baseband signals, which have been converted into digital signals in the ADCs 20, are combined first, and then the combined signal is input to the digital filter 31.

Figure 3A:
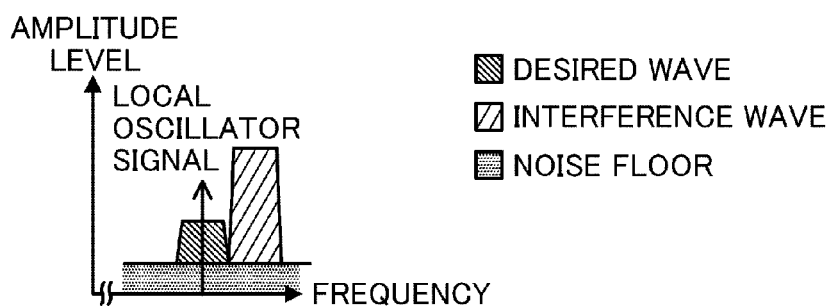
FIGS. 3A-3E are diagrams illustrating output frequency spectra of respective signal processing blocks in the receiver circuit according to the first embodiment.
Figure 3B:
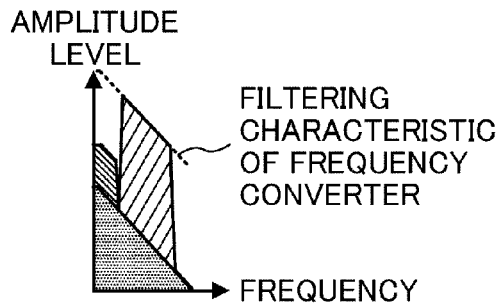
Figure 3C:
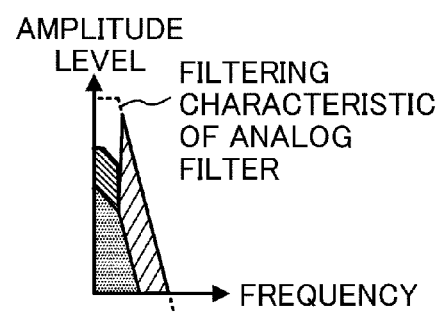
Figure 3D:
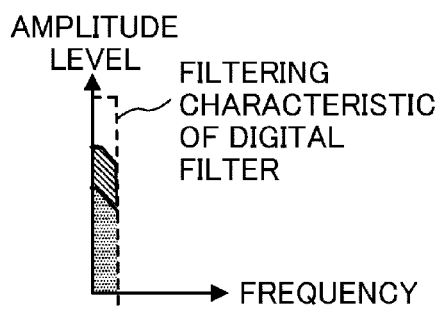
Figure 3E:
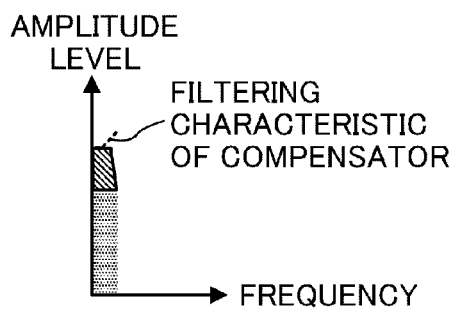

FIGS. 3A-3E illustrate output frequency spectra of respective signal processing blocks. FIG. 3A illustrates an output frequency spectrum of the LNA 11. The high frequency signal shown here is, for example, a digital broadcast wave, and a high level of interference wave is present adjacent to the desired wave. FIG. 3B illustrates an output frequency spectrum of the frequency converters 12A. Each of the frequency converters 12A performs frequency conversion using, for example, a local oscillator signal having a center frequency of the desired-wave band (direct conversion method). The filtering operations of the frequency converters 12A significantly attenuate the interference waves, allowing the levels of distortion components generated in the amplifiers 15 and in the analog filters 16 to be significantly reduced. FIG. 3C illustrates an output frequency spectrum of the analog filters 16. The filtering operations of the analog filters 16 further attenuate the interference waves. It is assumed here that each of the ADCs 20 has a sufficiently wide dynamic range to perform analog-to-digital conversion over a range from the minimum amplitude level of the attenuated desired wave to the maximum amplitude level of the remaining interference wave. FIG. 3D illustrates an output frequency spectrum of the digital filters 31. The filtering operations of the digital filters 31 remove the interference waves. FIG. 3E illustrates an output frequency spectrum of the compensators 32. The filtering operations of the compensators 32 compensate the signal levels in the desired-wave band so as to be equalized. As described above, if the dynamic range of the ADCs 20 is wide enough, the desired-wave band can be compensated without degradation in signal quality. Thus, degradation in signal quality in the demodulator 40 (described later) can be prevented.

Returning to FIG. 1, a demodulator 40 demodulates the output of the digital signal processor 30A, thereby generates a video or audio signal. In the case of an analog broadcast signal, the demodulator 40 performs digital-to-analog conversion on the output of the digital signal processor 30A before demodulation. A control unit 50 controls the variable gain or the variable filtering characteristic of each of signal processing blocks, that is, the LNA 11, the frequency converters 12A, the amplifiers 15, and the compensators 32, depending on a reception level of the high frequency signal input to the receiver circuit. The control unit 50 can detect the reception level of the high frequency signal by, for example, comparing the output level of the digital signal processor 30A with a reference level. The reference level is assumed to be high enough for the demodulator 40 to perform demodulation. A level comparator may be additionally provided so that the reception level of the high frequency signal is detected by a result of comparison between the output level of each of the signal processing blocks and the reference level.

The variable gain or the variable filtering characteristic of each of the signal processing blocks is controlled specifically as follows. If the reception level of the high frequency signal is low, the gains of the LNA 11 and of the amplifiers 15 are increased. In addition, the cutoff frequency of the frequency converters 12A is increased, and a filtering characteristic dependent on the change in the cutoff frequency is set to the compensators 32. The cutoff frequency of the frequency converters 12A may be increased when the gain of the LNA 11 is controlled so as to be a maximum value. Meanwhile, if the reception level of the high frequency signal is high, the gains of the LNA 11 and of the amplifiers 15 are decreased. In addition, the cutoff frequency of the frequency converters 12A is decreased, and a filtering characteristic dependent on the change in the cutoff frequency is set to the compensators 32. A decrease of the cutoff frequency causes the NF of the frequency converters 12A to be decreased, thereby improving the interference wave immunity of the amplifiers 15 and of the analog filters 16 provided in succeeding stages of the frequency converters 12A. Moreover, the lowest receive sensitivity of the receiver circuit can be prevented from being reduced.

Figure 4:
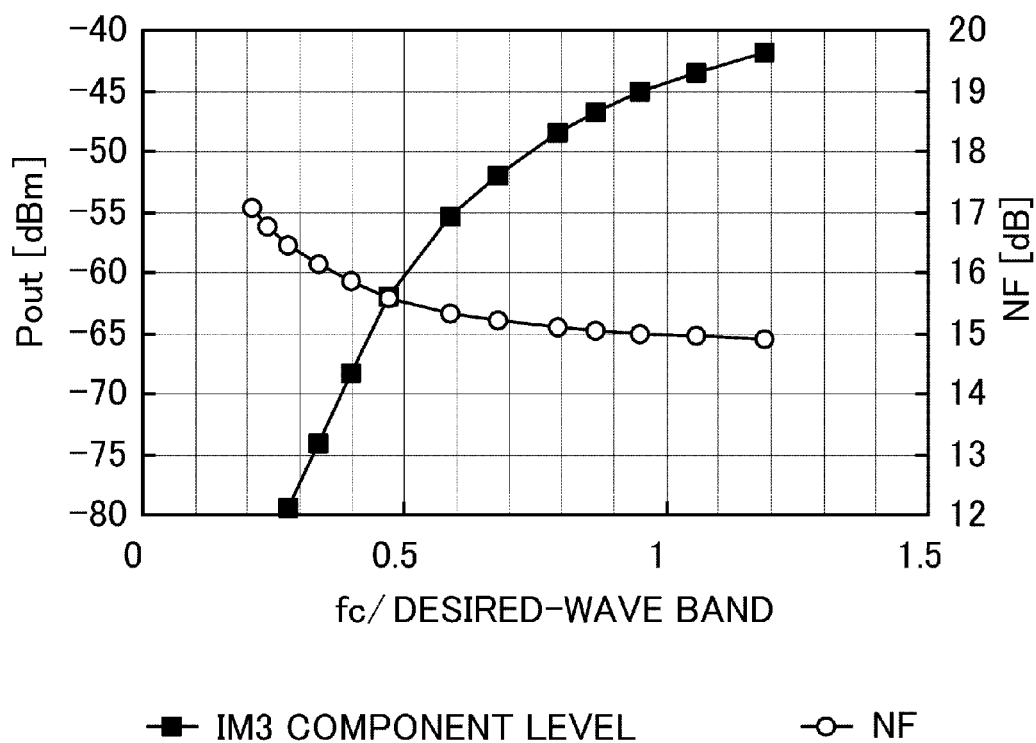
FIG. 4 is a graph illustrating the relationships between the cutoff frequency of the frequency converter and IM3 and NF, respectively.

FIG. 4 illustrates the relationships between the cutoff frequency of the frequency converters 12A and IM3 and NF, respectively. The horizontal axis represents the ratio of the cutoff frequency to the desired-wave band. The left vertical axis represents the third-order distortion component (IM3) generated in the amplifiers 15. The right vertical axis represents the NF of a circuit part including the frequency converters 12A and the amplifiers 15. It is assumed that the gain of the frequency converter 12A is 18 dB, and that the LPF characteristic is a second-order characteristic. It is also assumed that the gain of the amplifiers 15 is 21 dB, IIP3=0 dBm, and NF=25 dB. The graph shown as an example illustrates a case in which an interference wave of −30 dBm is input adjacent to the desired-wave band. The NF and IM3 values change in the opposite way with respect to the horizontal axis. At a value of about 0.5 along the horizontal axis, the NF degradation can be reduced to about 0.5 dB while the IM3 can be reduced by as much as about 20 dB. Therefore, as described above, the cutoff frequency of the frequency converters 12A is preferably about half the desired-wave band.

Thus, according to this embodiment, even if the distortion characteristic of each of the signal processing blocks significantly degrades due to low voltage operation, the filtering characteristic of the frequency converters 12A allows the distortion components generated in the amplifiers 15 and in the analog filters 16 to be reduced. Moreover, compensation of the signal components in the desired-wave band by the compensators 32 allows the interference wave immunity of the receiver circuit to be improved.

Second Embodiment

Figure 5:
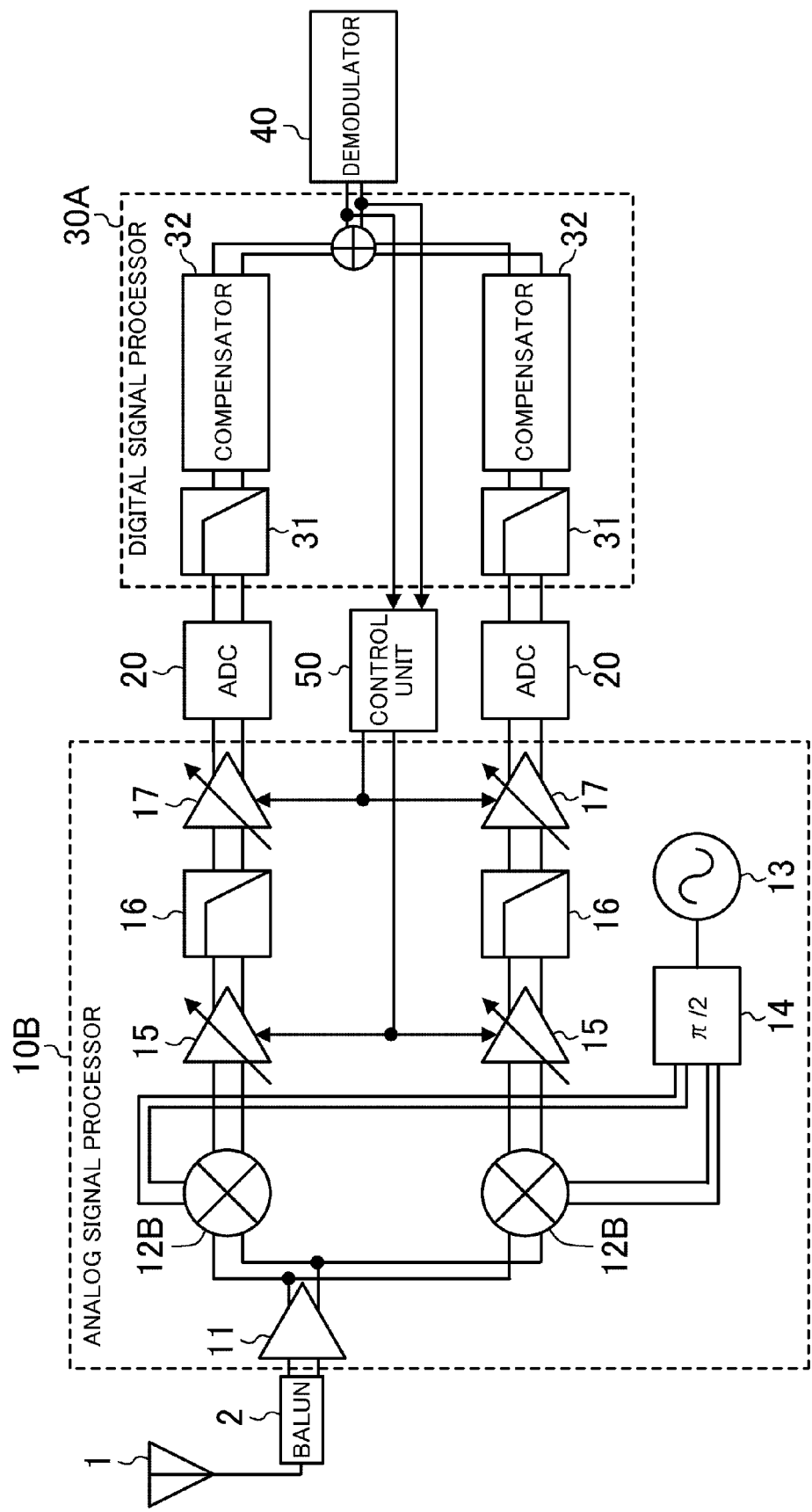
FIG. 5 is a configuration diagram of a receiver circuit according to the second embodiment.

FIG. 5 illustrates a configuration of a receiver circuit according to the second embodiment. The differences from the first embodiment will be described below.

In an analog signal processor 10B, frequency converters 12B only frequency-convert the output of the LNA 11 respectively using the I and Q local oscillator signals, and have no low pass filtering characteristics. Instead, the analog filters 16 perform low pass filtering on the outputs of the frequency converters 12B at a cutoff frequency below the desired-wave band. In addition, amplifiers 17 are provided in succeeding stages of the analog filters 16. This is to apply a lower gain to the amplifiers 15, and to sufficiently amplify the signals filtered by the analog filters 16 because amplification of the outputs of the frequency converters 12B at a high gain in the amplifiers 15 may degrade the distortion characteristic due to a high level of interference wave. The gains of the amplifiers 15 and 17 are controlled by the control unit 50.

Figure 6A:
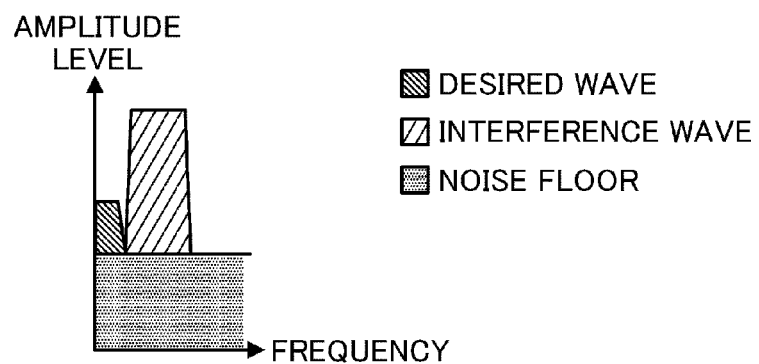
FIGS. 6A-6C are diagrams illustrating output frequency spectra of respective signal processing blocks in the receiver circuit according to the second embodiment.
Figure 6B:
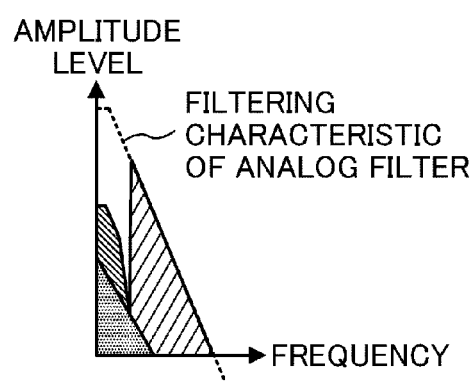
Figure 6C:
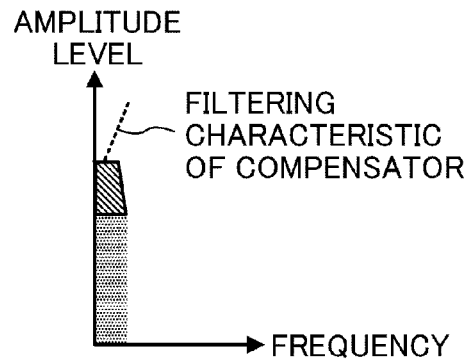

FIGS. 6A-6C illustrate output frequency spectra of respective signal processing blocks. FIG. 6A illustrates an output frequency spectrum of the frequency converters 12B. The high frequency signal shown here is, for example, a digital broadcast wave, and a high level of interference wave is present adjacent to the desired wave. FIG. 6B illustrates an output frequency spectrum of the analog filters 16. The filtering operations of the analog filters 16 significantly attenuate the interference waves, allowing the levels of distortion components generated in the amplifiers 17 to be significantly reduced. FIG. 6C illustrates an output frequency spectrum of the compensators 32. The filtering operations of the compensators 32 compensate the signal levels in the desired-wave band so as to be equalized.

Thus, according to this embodiment, even if the distortion characteristic of each of the signal processing blocks significantly degrades due to low voltage operation, the filtering characteristic of the analog filters 16 allows the distortion components generated in the amplifiers 17 to be reduced. Moreover, compensation of the signal components in the desired-wave band by the compensators 32 allows the interference wave immunity of the receiver circuit to be improved.

Note that, similarly to the first embodiment, the control unit 50 may control the gain of the LNA 11. Other configurations may also be used in which the amplifiers 17 are removed, and the amplifiers 15 each have a higher gain, although the interference wave immunity will degrade in some degree.

Third Embodiment

Figure 7:
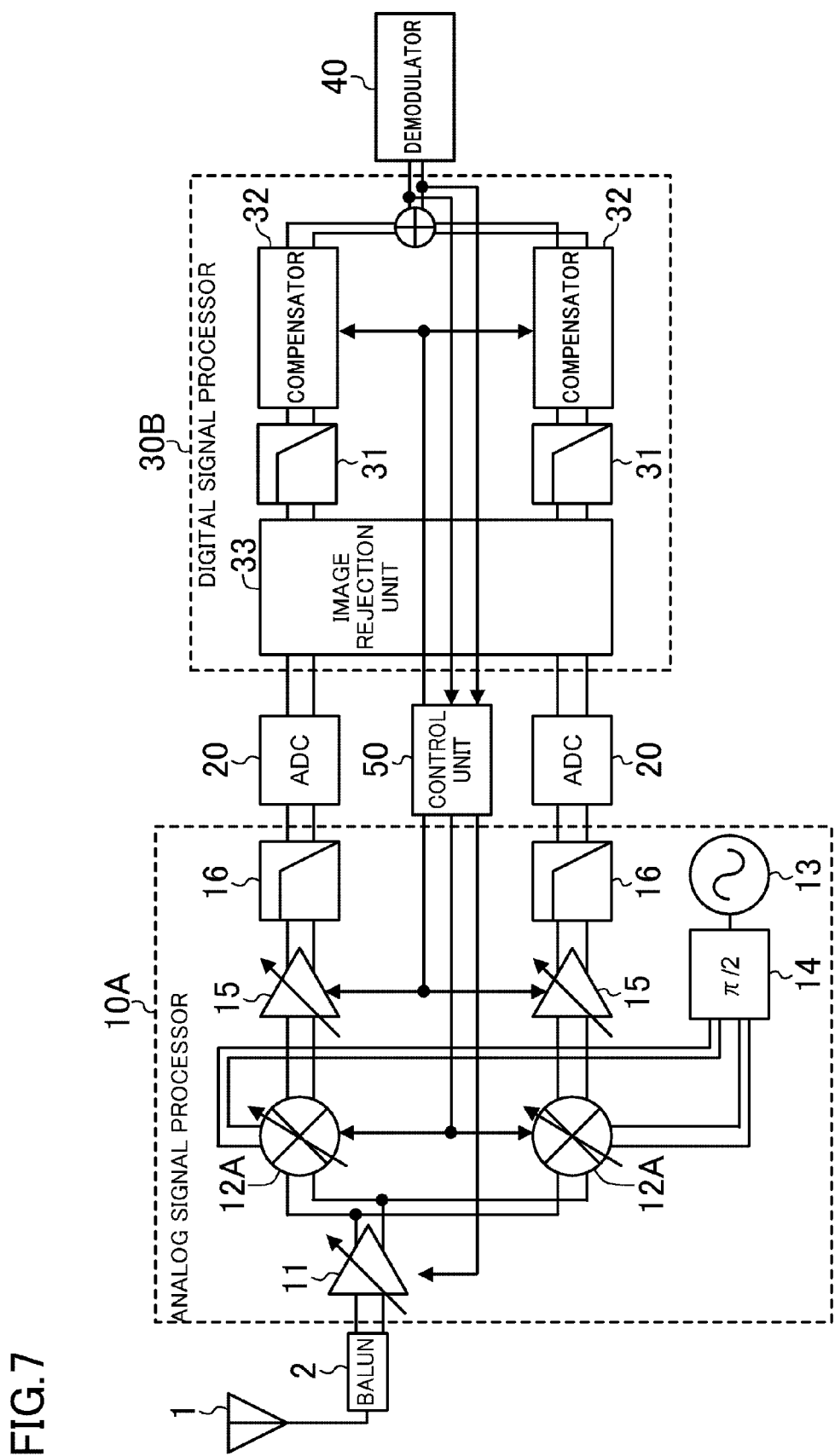
FIG. 7 is a configuration diagram of a receiver circuit according to the third embodiment.

FIG. 7 illustrates a configuration of a receiver circuit according to the third embodiment. The receiver circuit of this embodiment differs from the receiver circuit of FIG. 1 in that an image rejection unit 33 is added. The differences from the first embodiment will be described below.

In the analog signal processor 10A, the local oscillator 13 generates a local oscillator signal having a frequency below or above the desired-wave band. That is, the analog signal processor 10A performs frequency conversion of the low-intermediate frequency (IF) method, and thus the high frequency signal is converted into a baseband signal in the IF band. The IF has, for example, a value of half the desired-wave band. Furthermore, in a digital signal processor 30B, the image rejection unit 33 is provided in the preceding stage of the digital filters 31. The image rejection unit 33 receives the I and Q baseband signals respectively output from the ADCs 20, and removes image signal components contained in the respective signals.

Figure 8A:
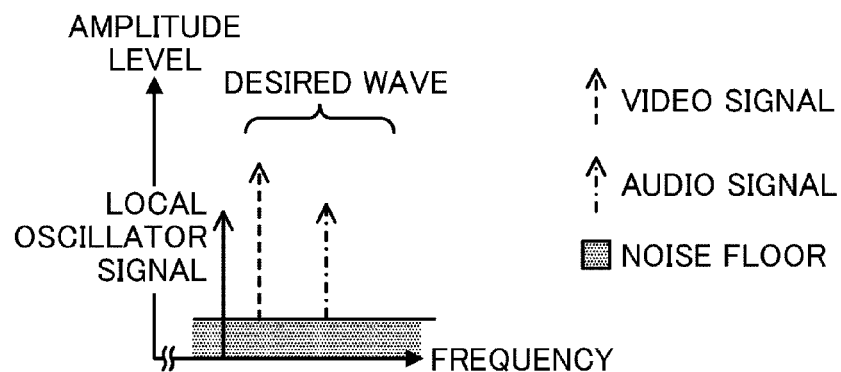
FIGS. 8A-8C are diagrams illustrating output frequency spectra of respective signal processing blocks in the receiver circuit according to the third embodiment.
Figure 8B:
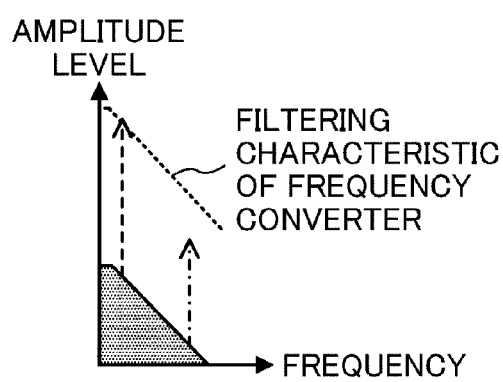
Figure 8C:
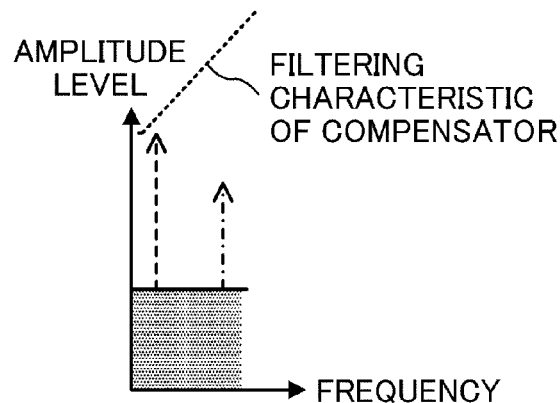

FIGS. 8A-8C illustrate output frequency spectra of respective signal processing blocks. FIG. 8A illustrates an output frequency spectrum of the LNA 11. The high frequency signal shown here is, for example, an analog broadcast wave, and contains high levels of video and audio signals in the desired-wave band. As shown here, an analog broadcast wave has a predetermined level difference and a predetermined frequency difference between the video and audio signals. In general, the video signal has a higher level and a lower frequency. Thus, frequency conversion is performed using a local oscillator signal having a frequency below the desired-wave band. Meanwhile, if the level of the video signal is lower than that of the audio signal, then frequency conversion is performed using a local oscillator signal having a frequency above the desired-wave band. FIG. 8B illustrates an output frequency spectrum of the frequency converters 12A. The video and audio signals are frequency-converted into the IF band, and are attenuated by the filtering operations of the frequency converters 12A. The low-IF frequency conversion causes the level difference between the video and audio signals to increase, thereby causing the level of the audio signal to significantly attenuate as compared to that of the video signal. Thus, the levels of intermodulation distortion components of the video and audio signals generated in the amplifiers 15 and in the analog filters 16 can be significantly reduced. FIG. 8C illustrates an output frequency spectrum of the compensators 32. The filtering operations of the compensators 32 each compensate the level difference between the video and audio signals so as to be the same as the level difference before the frequency conversion.

Thus, according to this embodiment, even if the distortion characteristic of each of the signal processing blocks significantly degrades due to low voltage operation, the low-IF frequency conversion and the filtering characteristic of the frequency converters 12A allow the distortion components generated in the amplifiers 15 and in the analog filters 16 to be reduced. Moreover, compensation of the signal components in the desired-wave band by the compensators 32 allows the SNDR characteristic of the receiver circuit to be improved. Note that a configuration in which the image rejection unit 33 is added to the receiver circuit of FIG. 4 also provides similar advantages.

Fourth Embodiment

Figure 9:
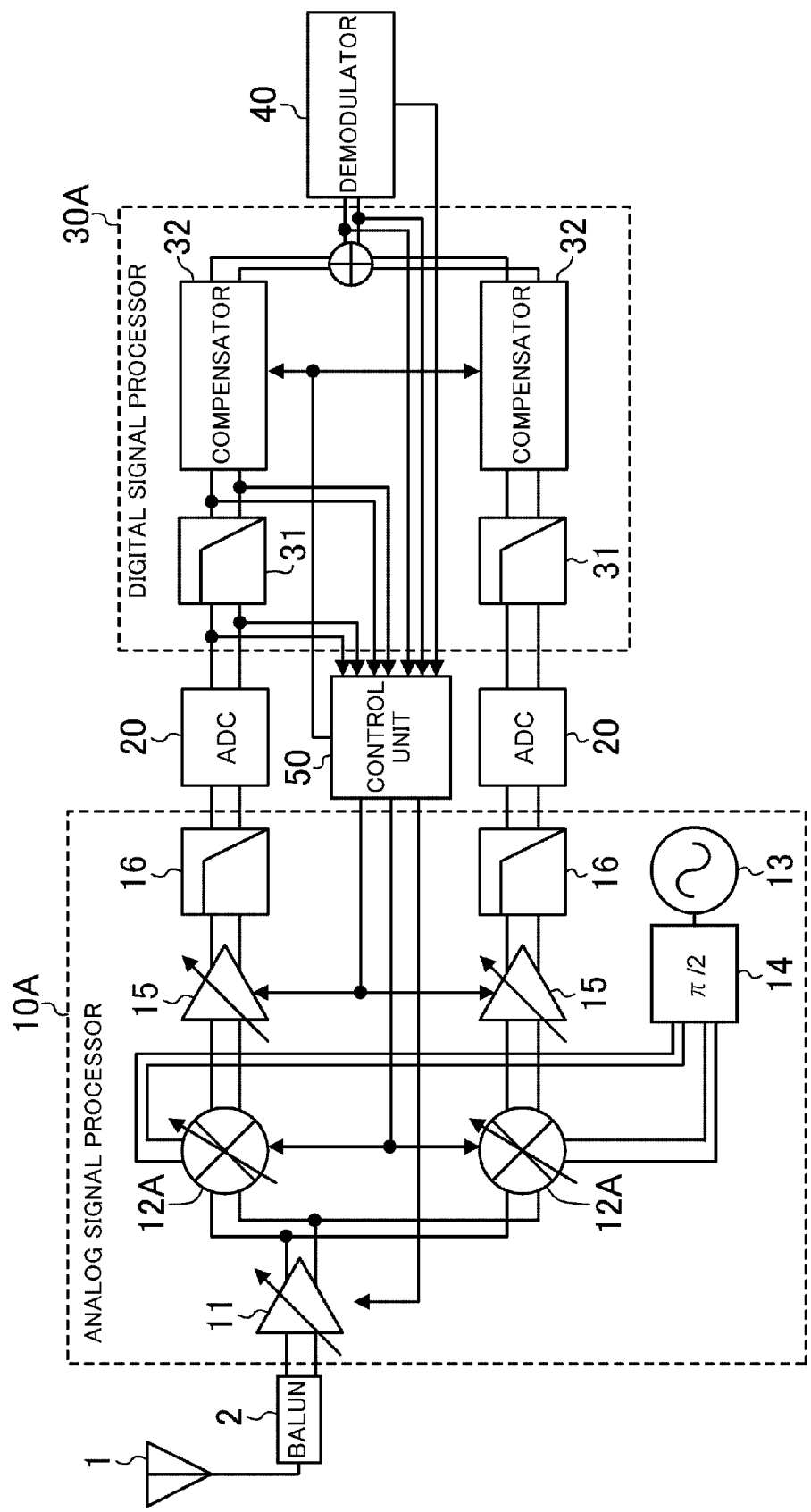
FIG. 9 is a configuration diagram of a receiver circuit according to the fourth embodiment.

FIG. 9 illustrates a configuration of a receiver circuit according to the fourth embodiment. The differences from the first embodiment will be described below.

The control unit 50 receives the input signal to, and the output signal from, the digital filter 31 which filters the I signal, detects the presence or absence of a high level of interference wave adjacent to the desired-wave band from the level difference between the input and output signals, and controls the signal processing blocks based on the detection result. For example, if the level difference between the input and output signals is greater than a threshold, a high level of interference wave is considered to be present, while the level difference between the input and output signals is less than the threshold, a high level of interference wave is considered to be absent. If a high level of interference wave is not detected, the control unit 50 increases the gains of the LNA 11 and of the amplifiers 15, increases the cutoff frequency of the frequency converters 12A, and sets a filtering characteristic dependent on the change in the cutoff frequency in the compensators 32. Meanwhile, if a high level of interference wave is detected, the control unit 50 decreases the gains of the LNA 11 and of the amplifiers 15, decreases the cutoff frequency of the frequency converters 12A, and sets a filtering characteristic dependent on the change in the cutoff frequency in the compensators 32.

The demodulator 40 evaluates signal quality after demodulation. Examples of the signal quality include a BER characteristic, a C/N characteristic, etc. The control unit 50 adjusts the filtering characteristic of the compensators 32 based on the evaluation result of the demodulator 40.

Thus, according to this embodiment, even if the distortion characteristic of each of the signal processing blocks significantly degrades due to low voltage operation, changing the filtering characteristic of the frequency converters 12A depending on the presence or absence of an interference wave allows the distortion components generated in the amplifiers 15 and in the analog filters 16 to be reduced. Moreover, compensation of the signal components in the desired-wave band by the compensators 32 allows the interference wave immunity of the receiver circuit to be improved. Furthermore, monitoring the signal quality characteristic of the demodulator 40 allows the filtering characteristic of the compensators 32 to be adaptively controlled so that an optimum interference wave immunity is achieved.

In each of the above embodiments, the configuration may be modified such that the balun 2 is removed, and each signal processing block processes a non-differential signal.

EXAMPLE OF APPLICATION

Figure 10:
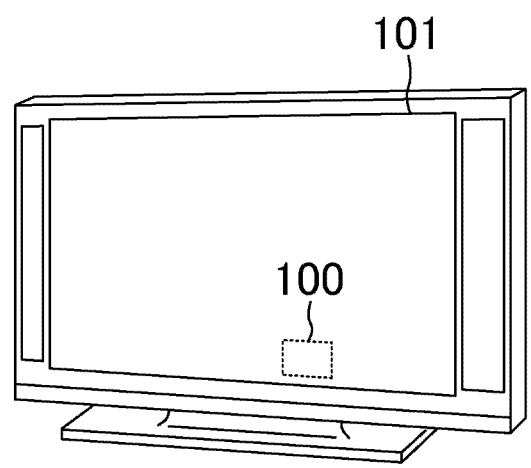
FIG. 10 is a schematic diagram of a receiver apparatus according to any of the embodiments of the present invention.

FIG. 10 illustrates an overview of a receiver apparatus according to any of the embodiments of the present invention. The receiver apparatus is, for example, a television receiver including a receiver circuit 100 according to any of the above embodiments, and a display panel 101 as an output device for displaying the output of the receiver circuit 100. The receiver circuit 100 can also be applied to a television broadcast recorder including a storage as an output device.

What is claimed is:
1. A receiver circuit, comprising:
an analog signal processor configured to frequency-convert an input high frequency signal into a baseband signal, and to perform low pass filtering at a cutoff frequency below a desired-wave band;
an analog-to-digital converter (ADC) configured to convert an output of the analog signal processor into a digital signal; and
a digital signal processor configured to compensate an output of the ADC for a signal component in the desired-wave band which has been attenuated by the filtering operation of the analog signal processor,
wherein the analog signal processor includes:
a first amplifier configured to perform low noise amplification on the high frequency signal,
a local oscillator configured to generate a local oscillator signal,
a frequency converter configured to frequency-convert an output of the first amplifier using the local oscillator signal, and to perform the low pass filtering on a frequency-converted signal at the cutoff frequency below the desired-wave band,
a second amplifier configured to amplify an output of the frequency converter, and
an analog filter configured to attenuate a signal component outside of the desired-wave band contained in an output of the second amplifier, and
the digital signal processor includes:
a digital filter configured to remove a signal component outside of the desired-wave band contained in the output of the ADC, and
a compensator configured to filter an output of the digital filter with an inverse characteristic relative to that of the frequency converter.

2. The receiver circuit of claim 1, wherein
filtering characteristics of the frequency converter and of the compensator are variable, and
the receiver circuit includes a control unit configured to control the respective filtering characteristics of the frequency converter and of the compensator depending on a reception level of the high frequency signal.

3. The receiver circuit of claim 2, wherein
a gain of at least one of the first or the second amplifier is variable, and
if the reception level of the high frequency signal is low, the control unit increases the variable gain and the cutoff frequency of the frequency converter, and if the reception level of the high frequency signal is high, the control unit decreases the variable gain and the cutoff frequency of the frequency converter.

4. The receiver circuit of claim 2, wherein the control unit detects a presence or absence of a high level of interference wave adjacent to the desired-wave band from a level difference between an input and the output of the digital filter, and if the interference wave is not detected, the control unit increases the cutoff frequency of the frequency converter, and if the interference wave is detected, the control unit decreases the cutoff frequency of the frequency converter.

5. The receiver circuit of claim 2, wherein the control unit detects the reception level of the high frequency signal from an output of the compensator.

6. The receiver circuit of claim 2, further comprising a demodulator configured to demodulate a signal output from the digital signal processor,
wherein the demodulator evaluates signal quality after demodulation, and
the control unit adjusts the filtering characteristic of the compensator based on an evaluation result of the demodulator.

7. The receiver circuit of claim 1, wherein
a gain of the second amplifier is variable, and
the receiver circuit includes a control unit configured to control the gain of the second amplifier depending on a reception level of the high frequency signal.

8. The receiver circuit of claim 1, wherein the cutoff frequency is about half the desired-wave band.

9. The receiver circuit of claim 1, wherein the analog signal processor frequency-converts the high frequency signal into a low-intermediate frequency band.

10. A receiver apparatus, comprising:
the receiver circuit of claim 1; and
an output device configured to record or display an output of the receiver circuit.

11. A receiver circuit, comprising:
an analog signal processor configured to frequency-convert an input high frequency signal into a baseband signal, and to perform low pass filtering at a cutoff frequency below a desired-wave band;
an analog-to-digital converter (ADC) configured to convert an output of the analog signal processor into a digital signal; and
a digital signal processor configured to compensate an output of the ADC for a signal component in the desired-wave band which has been attenuated by the filtering operation of the analog signal processor,
wherein the analog signal processor includes:
a first amplifier configured to perform low noise amplification on the high frequency signal,
a local oscillator configured to generate a local oscillator signal,
a frequency converter configured to frequency-convert an output of the first amplifier using the local oscillator signal,
a second amplifier configured to amplify an output of the frequency converter, and
an analog filter configured to perform the low pass filtering on an output of the second amplifier at the cutoff frequency below the desired-wave band, and
the digital signal processor includes:
a digital filter configured to remove a signal component outside of the desired-wave band contained in the output of the ADC, and
a compensator configured to filter an output of the digital filter with an inverse characteristic relative to that of the analog filter, and
wherein a gain of the second amplifier is variable, and
the receiver circuit includes a control unit configured to control the gain of the second amplifier depending on a reception level of the high frequency signal,
the analog signal processor includes a third amplifier configured to amplify an output of the analog filter with a variable gain, and
the control unit controls a gain of the third amplifier depending on the reception level of the high frequency signal.

12. A receiver circuit, comprising:
an analog signal processor configured to frequency-convert an input high frequency signal into a baseband signal, and to perform low pass filtering at a cutoff frequency below a desired-wave band;
an analog-to-digital converter (ADC) configured to convert an output of the analog signal processor into a digital signal; and
a digital signal processor configured to compensate an output of the ADC for a signal component in the desired-wave band which has been attenuated by the filtering operation of the analog signal processor,
wherein the analog signal processor includes:
a first amplifier configured to perform low noise amplification on the high frequency signal,
a local oscillator configured to generate a local oscillator signal,
a frequency converter configured to frequency-convert an output of the first amplifier using the local oscillator signal,
a second amplifier configured to amplify an output of the frequency converter, and
an analog filter configured to perform the low pass filtering on an output of the second amplifier at the cutoff frequency below the desired-wave band, and the digital signal processor includes:
- a digital filter configured to remove a signal component outside of the desired-wave band contained in the output of the ADC, and
- a compensator configured to filter an output of the digital filter with an inverse characteristic relative to that of the analog filter, and wherein a gain of the second amplifier is variable, and the receiver circuit includes a control unit configured to control the gain of the second amplifier depending on a reception level of the high frequency signal, and wherein the control unit detects the reception level of the high frequency signal from an output of the compensator.

13. A receiver circuit, comprising:

an analog signal processor configured to frequency-convert an input high frequency signal into a baseband signal, and to perform low pass filtering at a cutoff frequency below a desired-wave band;

an analog-to-digital converter (ADC) configured to convert an output of the analog signal processor into a digital signal; and a digital signal processor configured to compensate an output of the ADC for a signal component in the desired-wave band which has been attenuated by the filtering operation of the analog signal processor, wherein the analog signal processor includes:
- a first amplifier configured to perform low noise amplification on the high frequency signal,
- a local oscillator configured to generate a local oscillator signal,
- a frequency converter configured to frequency-convert an output of the first amplifier using the local oscillator signal,
- a second amplifier configured to amplify an output of the frequency converter, and
- an analog filter configured to perform the low pass filtering on an output of the second amplifier at the cutoff frequency below the desired-wave band, and the digital signal processor includes:
- a digital filter configured to remove a signal component outside of the desired-wave band contained in the output of the ADC, and
- a compensator configured to filter an output of the digital filter with an inverse characteristic relative to that of the analog filter, said receiver circuit further comprising a demodulator configured to demodulate a signal output from the digital signal processor, wherein the demodulator evaluates signal quality after demodulation, wherein a gain of the second amplifier is variable, and the receiver circuit includes a control unit configured to control the gain of the second amplifier depending on a reception level of the high frequency signal, and the control unit adjusts the filtering characteristic of the compensator based on an evaluation result of the demodulator.

* * * * *